Sept. 12, 1950      J. C. FIRESTINE      2,521,705
CYANINE DYES
Filed Aug. 21, 1946
*Fig. 1-A.*
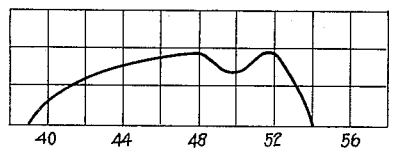
*Fig. 1-B.*
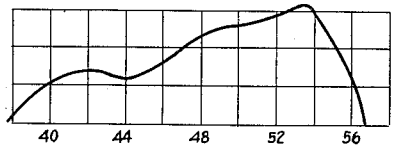
INVENTOR.
John Charles Firestine
BY
Lynn Barratt Morris
ATTORNEY Patented Sept. 12, 1950

2,521,705

UNITED STATES PATENT OFFICE 2,521,705

CYANINE DYES

John Charles Firestine, South River, N. J., assignor to E. I. du Pont de Nemours & Company, Wilmington, Del., a corporation of Delaware Application August 21, 1946, Serial No. 692,126

5 Claims. (Cl. 260—240.65)

This invention relates to the preparation of new oxazoles. More particularly, it relates to the preparation of 2-methyl-5-benzoyl benzoxazole and its cyclammonium salts and to the preparation of cyanine dyes therefrom. It further pertains to silver halide emulsions containing such dyes.

An object of this invention is to provide new and useful oxazole compounds. A further object is to provide such compounds which contain a reactive methyl group in the alpha position to the heterocyclic nitrogen atoms. A still further object is to provide a new class of oxazole cyclammonium salts which are capable of entering into cyanine dye condensation reactions. Another object is to provide a new class of cyanine dyes which confer an extra range of spectral sensitivity to photographic silver halide emulsions. Yet another object is to provide photographic silver halide emulsions with an extra range of spectral sensitivity. Still other objects will be apparent from the following description of the invention.

It has been found that 2-methyl-5-benzoyl benzoxazole can be prepared in a practical manner by reacting p-hydroxy-benzophenone dissolved in a solvent with nitric acid to yield m-nitro-p-hydroxybenzophenone. The latter compound can then readily be reduced by means of powdered metal in acid solution to the corresponding amino compound which can be simultaneously or subsequently condensed with acetic anhydride to yield 2-methyl-5-benzoyl benzoxazole which has the structural formula:

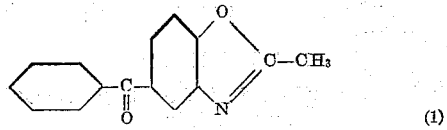

(1)

The compounds of Formula 1 can readily be converted into cyclammonium salts or quaternary salts by reaction with an alkyl or aralkyl salt, e. g., an alkyl halide including ethyl bromide and methyl chloride, ethyl- and methyl-p-toluene sulfonate, dialkyl sulfate, e. g., diethyl sulfate and dimethyl sulfate, ethyl perchlorate, etc. The former salts may be represented by the general formula:

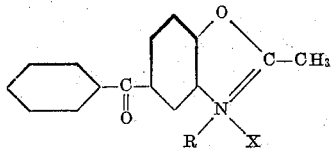

(2)

wherein R is an alkyl or aralkyl radical, e. g., methyl and ethyl and benzyl, and X represents the negative radical of an acid, e. g., Cl, Br, I, SO$_4$CH$_3$, ClO$_4$, —SO$_3$C$_6$H$_5$CH$_3$, etc.

The compounds of Formula 2 have been found to react similarly to 2-methyl benzthiazole quaternary salts with other reactive heterocyclic nitrogen salts to form various mono- and polymethine dyes. The bases can be simultaneously reacted with alkyl salts and condensed to form a cyanine dye if desired. However, the stepwise method is, in general, preferable to the simultaneous salt formation and dye condensation reaction.

A preferred aspect of the invention is concerned with the preparation of carbocyanine dyes including those which contain substituted methine groups and the symmetrical and unsymmetrical types. When the symmetrical type are desired, two molecules of 2-methyl-5-benzoyl benzoxazole quaternary salt are reacted with one mol of an ortho ester of a carboxylic acid. In addition, unsymmetrical carbocyanine dyes containing a benzoyl benzoxazole radical can be made by a process similar to that described in United States Patents 2,071,898 and 2,071,899.

The ortho esters useful in accordance with the above teachings may be simple or mixed and of aliphatic, cycloaliphatic or aromatic carboxylic acids, including aromatic substituted aliphatic acids and aliphatic substituted aromatic acids. The ortho esters of the carboxylic acids result in carbocyanine dyes which comprise two to three heterocyclic nitrogen nuclei, at least one of which is a 5-benzoyl benzoxazole radical bridged by a trimethenyl radical —CH=CH—CH= or by a substituted trimethenyl radical of the formula

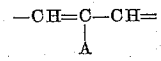

wherein A is a hydrocarbon radical. In the case of the ortho esters of aliphatic carboxylic acids having more than two carbon atoms in the acid molecule, A is an alkyl radical. When an ortho ester of an aromatic carboxylic acid is used, A is an aryl radical. When orthoformic acid esters are used, however, the central hydrogen atom may be replaced by heterocyclic nuclei.

Cyanine dyes which are bridged by a monomethenyl radical (—CH=) may be prepared by another embodiment of the invention by reacting a 2-methyl-5-benzoyl benzoxazole quaternary salt with a heterocyclic nitrogen compound of the type used in the preparation of cyanine dyes having a reactive thioether or selenoether group in an alpha or gamma position to a heterocyclic nitrogen atom or a reactive methyl or methylene group in such positions. Such compounds include the quaternary salts of the thioethers and selenoethers of substituted and unsubstituted thiazoles, thiazolines, oxazoles, oxazolines, selenazoles, selenazolines, pyridines, quinolines, indolenines, diazines, e. g., pyrimidines, thiadiazoles, and quinazolines and the corresponding polycyclic compounds, such as benzthiazoles, naphthazole and anthrathiazole.

The cyanine dyes may be incorporated with colloid-silver halide emulsions of various types including silver chloride, silver bromide, silver chlorobromide, silver iodobromide simple and mixed emulsions. Various types of colloids can be used to bind the light-sensitive silver salts, e. g., gelatin, albumin, agar agar, hydrophilic cellulose acetate, hydrophilic polyamides, the interpolymers of 2,397,866, etc. The dyes may be added to the emulsions in the form of solutions. Suitable solvents are the alcohols, for instance methyl or ethyl alcohol, which may be anhydrous or diluted with water. The dyes can be added to the emulsion during any stage of its production; however, they are preferably added to the finished emulsion before casting. They may be incorporated in the emulsion by coating or bathing the finished photographic layer in a bath in which the dye is dissolved. The quantity may vary widely from 15 to 30 milligrams per kilo of flowable emulsion containing about 9% gelatin, 4.5% of silver halide, and the rest water being a practical range of quantities.

The invention will be further illustrated by the following examples. The parts are all by weight.

EXAMPLE I

*(a) The nitration of p-hydroxybenzophenone*

Ninety grams of p-hydroxybenzophenone was dissolved in 150 cc. of glacial acetic acid and warmed to 50° C. Sixty grams of fuming nitric acid was then added dropwise at such a rate that the temperature lay between 45–50° C. When three-fourths of the nitric acid had been added, the nitro product crystallized and it was necessary to dilute the solution with another 100 cc. of acetic acid. When the nitric acid was completely added, the solution was stirred one-half hour longer and then poured into 3–4 volumes of cold water. The crystals were filtered, washed well with water and recrystallized from alcohol. The yield of m-nitro-p-hydroxybenzophenone was 75 grams of yellow sparkling crystals having a melting point of 94–94.5° C.

*(b) Preparation of 2-methyl-5-benzoyl benzoxazole*

Seventy-nine grams of the crystalline product obtained by nitration of p-hydroxybenzophenone in acetic acid was dissolved in 1000 cc. of acetic anhydride and heated to reflux. The heat source was then removed and the compound reduced by adding 150 grams of zinc dust in small portions. The reaction was violent and the additions were regulated accordingly. After the zinc had been added, the solution was refluxed for one hour longer and filtered from solid material. The filtrate was distilled up to 140° C. at 760 mm. pressure to remove excess acetic anhydride and then at 14 mm. to collect the product. 2-methyl-5-benzoyl benzoxazole distilled from 218–230° C./14 mm. as a clear viscous oil that solidified on cooling. It melted 103–103.5° C. The yield was 39 grams.

EXAMPLE II

*3-3'-diethyl, 5-5' dibenzoyl oxycarbocyanine iodide*

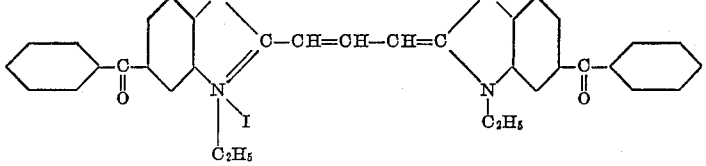

2-methyl-5-benzoyl benzoxazole (2.37 grams) was heated with diethyl sulphate (1.54 grams) at 130–140° C. for two hours. The melt was cooled and treated with 20 cc. of pyridine and 3 cc. of ethyl orthoformate. The resulting solution was heated to reflux for half an hour during which time an orange color developed. The hot solution was treated with an excess of a saturated aqueous solution of potassium iodide and cooled. The red crystals that formed were filtered, washed with water and alcohol, and crystallized twice from alcohol. The yield was 0.9 gram of glistening red needles.

This dye when added to a gelatin silver iodobromide emulsion extended the sensitivity to about 5600 Å. with a peak at 5400 Å. The spectral curve is set forth in Figure 1A of the drawing. When added to a gelatin silver chloride emulsion, it was found to extend the sensitivity to 5720 Å. with a broad peak at 5300 Å. The spectral curve is shown in Figure 1B of the drawing.

EXAMPLE III

*3-3' diethyl, 9 methyl, 5-5' dibenzoyl oxycarbocyanine iodide*

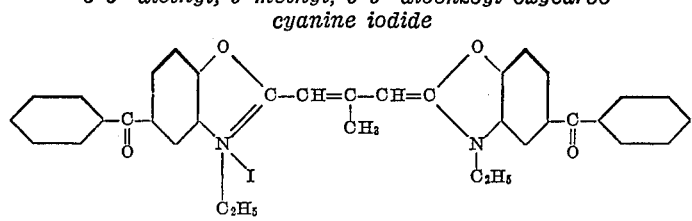

This dye was prepared by using the same procedures and quantities used in the preparation of the dye of Example II. Ethyl orthoacetate was substituted, however, in equal quantity for ethyl orthoformate. The dye was obtained at first as an oil from the reaction mixture but after purification with alcohol-ether solutions, it was converted to a red powder weighing 0.02 gram.

EXAMPLE IV

*2-2'-9-triethyl, 5-5' dibenzoyl oxycarbocyanine iodide*

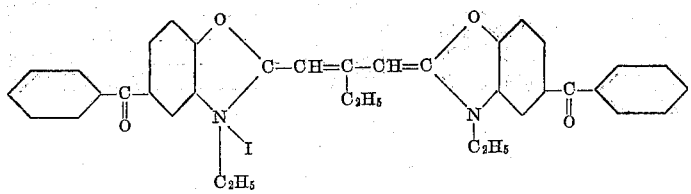

This dye was made in a similar manner to Example III except that ethylorthopropionate was substituted in equal quantity for ethylorthoacetate. The dye was obtained as 0.2 gram of red amorphous powder.

The condensations are preferably carried out in the presence of an acid binding agent or solvent, e. g., pyridine, piperidine, fused sodium acetate, tri-n-propylamine, and tri-ethanolamine, sodium ethylate, caustic soda, etc. Additional solvents may be used, e. g., acetic anhydride with sodium acetate, alcohol with alkali metal bases, etc.

As stated above, the preparation of unsymmetrical dyes also forms a part of this invention. By adding different heterocyclic nitrogen compounds of the type set forth in the penultimate paragraph preceding the examples or the corresponding alkyl compounds, e. g., having a methyl group instead of a mercapto or selenoether group, to the reaction mixtures, a number of cyanine and carbocyanine dyes may be prepared.

In place of the specific ortho esters of carboxylic acids, there may be substituted any ester of this type which is capable of reacting with the heterocyclic nitrogen compounds. Suitable esters include trimethyl ortho-propionate, methyldiethyl-n-caproate, methyldiethyl ortho-isocaproate, trimethyl ortho-formate, trimethyl ortho-benzoate, trimethyl ortho-p-toluate, trimethyl ortho-gamma-phenoxy-butyrate, trimethyl ortho-phenylacetate, trimethyl ortho valerate.

As many widely different embodiments of this invention can be made without departing from the spirit and scope thereof, it is to be understood that the invention is not to be limited except as defined by the claims.

What is claimed is:

1. A chemical compound of the general formula:

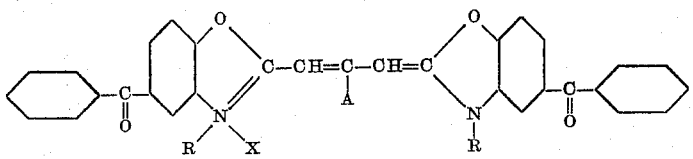

where R is taken from the group consisting of alkyl and aralkyl radicals, X is the negative radical of an acid and A is taken from the group consisting of hydrogen and alkyl radicals.

2. A dye having the structural formula

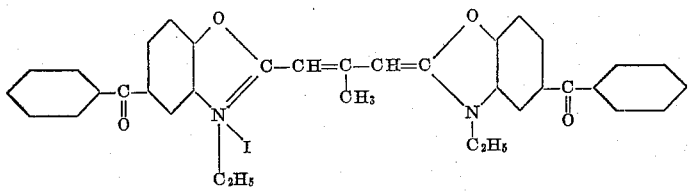

which in crystalline form has glistening red needles.

3. The process of preparing carbocyanine dyes which comprises reacting a 2-methyl-5-benzoylbenzoxazole quaternary salt with an alkyl ortho ester of a carboxylic acid in the presence of an acid binding agent.

4. A chemical compound of the formula:

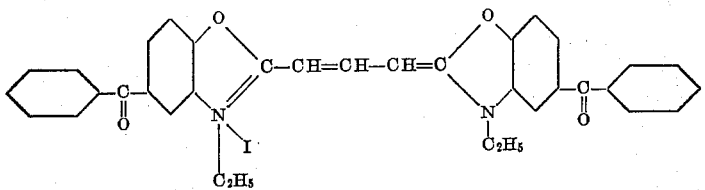

5. A chemical compound of the formula:

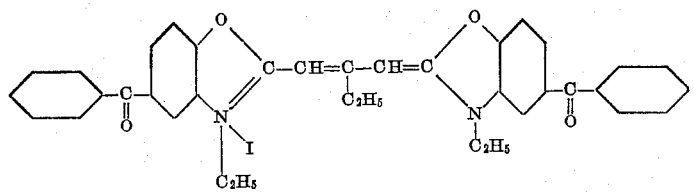

JOHN CHARLES FIRESTINE.

(References on following page)

REFERENCES CITED

The following references are of record in the file of this patent:

UNITED STATES PATENTS

| Number | Name | Date |
|---|---|---|
| 1,962,124 | Brooker | June 12, 1934 |
| 2,068,047 | Zeh | Jan. 19, 1937 |
| 2,071,898 | Piggott et al. | Feb. 23, 1937 |
| 2,071,899 | Piggott | Feb. 23, 1937 |
| 2,075,153 | Wilmann | Mar. 30, 1937 |
| 2,173,486 | Schneider | Sept. 19, 1939 |
| 2,323,504 | Wilson | July 6, 1943 |
| 2,350,393 | Eistert | June 6, 1944 |
| 2,362,337 | Anderson | Nov. 7, 1944 |
| 2,415,927 | Anish | Feb. 18, 1947 |